Figure 1:
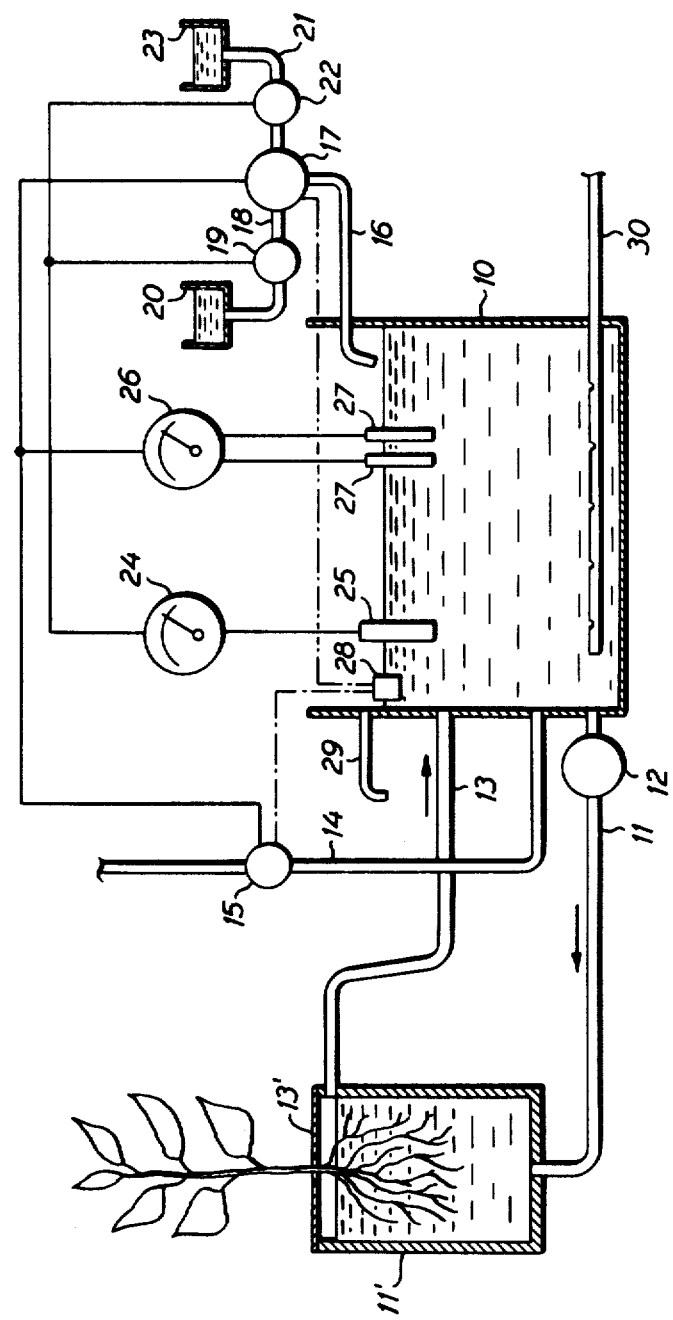

United States Patent [19]

Sjostedt et al.

[11] 4,245,433
[45] Jan. 20, 1981

[54] METHOD AND APPARATUS OF GROWING PLANTS WITHOUT SOIL

[76] Inventors: Ernst H. S. Sjostedt, Bolestad Handelstradgard, S-260 73 Ostra Ljungby; Jim A. Nissmo, Repslagarevagen 8, S-245 00 Staffanstorp, both of Sweden

[21] Appl. No.: 47,760

[22] Filed: Jun. 12, 1979

Related U.S. Application Data

[63] Continuation of Ser. No. 888,318, Mar. 20, 1978, abandoned, which is a continuation of Ser. No. 723,984, Sep. 16, 1976, abandoned.

[51] Int. Cl.³ .................................................. A01G 31/00
[52] U.S. Cl. ................................................ 47/59; 47/62
[58] Field of Search ........................................ 47/58-65

[56] References Cited

U.S. PATENT DOCUMENTS

| | | | |
|---|---|---|---|
| 2,350,982 | 6/1944 | Borst | 47/59 X |
| 3,578,431 | 5/1971 | Ingestad et al. | 47/62 X |
| 3,889,415 | 6/1975 | Holmes | 47/62 |
| 3,892,982 | 7/1975 | Holmes | 47/62 X |
| 3,925,926 | 12/1975 | Shigeo | 47/62 X |

OTHER PUBLICATIONS

Mineral nutrient - - -, Ingestad, Plant Phys. 52, 1972, pp. 332-338.
A definition of - - -, Ingestad, Phys. Plant. 24, 1971, pp. 118-125.
Physiologically balanced - - -, Trelease et al., Science, vol. 78, No. 2028, Nov. 10, 1933, pp. 438-439.
Hydrogen ion concentration - -, Arnon et al., Plant Physiol., vol. 17, 1942, pp. 515-524.
Nutrient solutions - -, Purdue Univ., Circ. 232, Oct. 1938, pp. 11-14.
The Tanks are coming, Spessard, Hydroponics Inc., 1948, pp. 74, 76, 93, 106-107.

*Primary Examiner*—Robert E. Bagwill
*Attorney, Agent, or Firm*—Paul L. Gardner

[57] ABSTRACT

For the control of the pH value of a nutrient solution for growing plants the pH value is increased by supplying nitrate nitrogen and is decreased by supplying ammonium nitrogen to the nutrient solution.

34 Claims, 2 Drawing Figures

METHOD AND APPARATUS OF GROWING PLANTS WITHOUT SOIL

RELATED APPLICATIONS

This application is a continuation of U.S. patent application Ser. No. 888,318 filed Mar. 20, 1978 which, in turn, is a continuation of U.S. patent application Ser. No. 723,984 filed Sept. 16, 1976 (both abandoned).

The invention relates to a method and apparatus of growing plants without soil by means of a plant nutrient solution circulating in a closed system.

It is known that there can be obtained in growing plants without soil in this way, a good growth and a high yield by maintaining always an accurately adjusted nutrition condition in the circulating nutrient solution, raw water and plant nourishment being supplied as they are consumed, while a predetermined balance between the nutrient substances included in the plant nutrient solution is maintained. However, an incorrect balance will rapidly turn up as a reduced yield or as direct symptoms of decease of the plants and, therefore, there are great demands as far as the control of the nutrition condition of the plant nutrient solution is concerned. This control is performed by adding concentrated main solutions of different compositions in dependence of measured values of the pH concentration and the conductivity of the nutrient solution.

Method and means for growing plants without soil are described in the Swedish Pat. No. 323 255 and the addition thereof 331 610. This method has been used in practice for some time when growing tomatoes in greenhouses; the nutrient solution used had the following relative composition of the macro nutrient substances therein:

| | |
|---|---|
| N | 100 |
| P | 15 |
| K | 95 |
| Mg | 15 |
| S | 10 |
| Ca | 30 |

Moreover, the nutrient solution contained necessary micro nutrient substances (tracers) such as iron, manganese, zink, boron, copper, molybdenium and cobalt.

80% of the nitrogen was in the form of nitrate nitrogen, and 20% thereof in the form of ammonium nitrogen. After some time the plants presented evident indication of lack of potassium—yellow leaf edges, bad quality of the fruits—and therefore the potassium content was raised from 95 to 123, i.e. to a value which considerably deviated from the value prescribed according to the patent. Then, the pH value decreased after some time and continued to decrease although the supply of potassium was increased. After three months a pH value of 3.6 had been reached according to laboratory analysis (continuous pH control was not performed at this practical test) while the ideal pH value is about 5.5; the pH value should in any case be above 4. Now the plants were characterized by relative lack of water direct symptoms of decease being a consequence thereof (pistil putrefaction).

On the basis of the experiences made at this practical test of the prior art method it is proposed according to the invention a method for growing plants without soil by means of a plant nutrient solution circulating in a closed system, wherein plant nourishment consumed is replaced by the supply of one or the other of two concentrated stock solutions in dependence of a measured pH concentration of the plant nutrient solution, wherein nitrogen is supplied by one stock solution in the form of nitrate nitrogen at the decrease of the pH concentration below a predetermined value in order to increase the pH value by the plants taking up nitrate nitrogen, wherein nitrogen is supplied by the other stock solution in the form of ammonium nitrogen at the increase of the pH concentration over the predetermined value in order to decrease the pH value by the plants taking up ammonium nitrogen, and wherein the potassium content of the plant nutrition solution is maintained at 100 to 150% of the nitrogen content of the plant nutrition solution.

Figure 2:
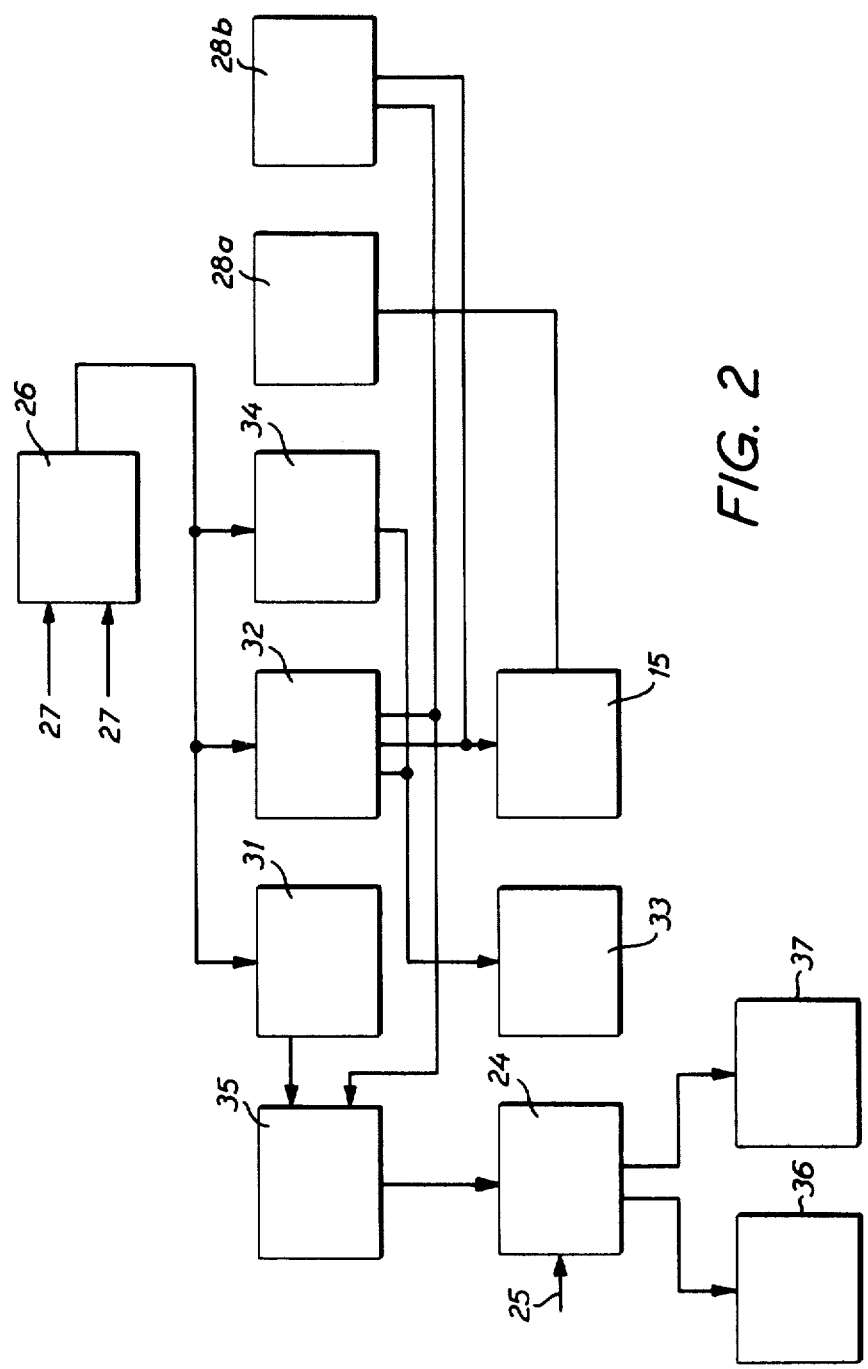

In order to elucidate the invention an embodiment thereof will be described in detail in the following reference being made to the accompanying drawing:

FIG. 1 discloses diagrammatically an equipment for working the method according to the invention, and FIG. 2 is a somewhat modified embodiment of the equipment for working the method according to the invention.

The equipment disclosed comprises a tank 10 for nutrient solution which is provided with an output conduit 11 having a liquid pump 12 by means of which the nutrient solution is pumped from the tank to channels 11' or flat tubes or hoses made of plastic foil in a greenhouse the plants being "planted" in these channels, tubes or hoses by the fact that their root system is situated more or less in the plant nutrient solution circulating therethrough. There is no soil in the channels, tubes or hoses, but there can be provided therein a suitable material wherein the nutrient solution is sucked up. If channels are used, these are preferably covered with plastic foil 13' or the like in order to reduce the direct evaporation from the channels. The root system of the plants thus extends in the channels, tubes or hoses, and the plants take their nourishment through the root system directly from the nutrient solution. From the channels the nutrient solution which has not been sucked up by the plants—the nutrient solution is of course supplied in a large excess—returns to the tank through a return conduit 13. To the tank there is connected a tube conduit 14 for the supply of raw water and this supply is controlled by means of a solenoid valve 15. For the supply of concentrated nutrient solution, stock solution, there is a conduit 16 having a solenoid valve 17 which has two inputs namely through a conduit 18 provided with a solenoid valve 19, from a vessel 20 and through a conduit 21 provided a solenoid valve 22, from a vessel 23. The solenoid valves 19 and 22 are controlled by a pH meter 24 the test probe 25 of which is immersed into the nutrient solution in the tank 10, while the solenoid valves 15 and 17 are controlled by means of a conductivity meter 26 the test probes 27 of which are also immersed into the nutrient solution in the tank 10, as well as by a float controlled level guard 28 for maintaining a predetermined liquid level in the tank. Finally, the tank is provided with a spillway 29 and with one or more perforated tube or hose conduits 30 which extend along the bottom of the tank and are connected to a compressor for blowing air into the nutrient solution from below and upwardly for oxygenating the nutrient solution and for providing turbulence and stirring of the nutrient solution such that this solution will have a uniform concentration and composition. Instead of air, carbon dioxide can be blown into the solution so that the plants will take up this carbon dioxide through the root system; for the rest carbon dioxide is taken up through the leaves. It is also conceivable to blow into the solution air as well as carbon dioxide or a mixture thereof.

According to the invention the plant is operated with two concentrated stock nutrient solutions which are received in the vessel 20 and the vessel 23, respectively. These stock solutions preferably both have a pH value of about 5.8 and thus both are acid. Below is given the relative composition of the two stock solutions:

|    | Vessel 20 | Vessel 23 |
|----|-----------|-----------|
| N  | 100       | 100       |
| P  | 15        | 15        |
| K  | 123       | 123       |
| Ca | 32        | 74        |
| Mg | 20        | 20        |

As far as the stock solution in the vessel 20 is concerned the nitrogen can comprise a mixture of 80% $Ca(NO_3)_2$ and 20% $NH_4NO_3$, while the nitrogen of the stock solution in the vessel 23 can comprise solely $Ca(NO_3)_2$. This explains the difference in the content of calcium in the two solutions. A calcium content which is higher than that which can be taken up by the plant can be accepted without further because the plant does not take up more calcium than it is in need of. The excess is harmless to the plants according to what has been found by tests made. As will be seen the potassium content is high and is considerably higher than the content prescribed according to patent 323 255 wherein the potassium content is limited to 40-100% of the nitrogen content according to the information given in the patent.

When the plants take up $Ca(NO_3)_2$ from the nutrient solution the roots of the plants will give off $OH-$ and $HCO_3-$ which are both basic, and therefore this emission of the plants provides an increase of the pH value. On the contrary, when the plants take up $NH_4NO_3$ the roots of the plants give off an $H+$ ion which provides a decrease of the pH value of the nutrient solution. By sensing the pH value by means of the meter 24 the two solenoid valves 19 and 22 now are controlled in such a way that the valve 19 is open for connection through the conduit 18 from the vessel 20 to the solenoid valve 17 when the pH value is above a predetermined value which is the nominal value of the pH concentration of the nutrient solution in the tank 10 while on the contrary the solenoid valve 21 is open in dependence of the pH meter 24 when the pH value of the nutrient solution in the tank 10 is below the said predetermined value, for maintaining a connection between the vessel 23 and the solenoid valve 17. Thus, either connection from the vessel 20 or from the vessel 23 is always open to the solenoid valve 17 but the supply of concentrated nutrient solution from one or the other of these two vessels is controlled not by the pH value of the nutrient solution in the tank 10 but of the conductivity of this solution; thus, the pH value determines the vessel from which the supply of stock solution, initiated in dependence of the conductivity value, shall take place. When the solution in the tank 10 is impoverished of the nutrient salts contained therein, the conductivity decreases which is sensed by means of the conductivity meter 25 which opens solenoid valve 15 at a predetermined value for the supply of nutrient solution to the tank. If on the other side the concentration of nutrient substances in the nutrient solution should be too high which is not unconceivable in case the evaporation from the channels or the plants is high, the conductivity meter will open solenoid valve 15 at a predetermined lower value of the conductivity measured, for the supply of raw water to the tank and thus dilution of the nutrient solution therein. Excess, if any, will escape through the spillway 29. The necessary amount of sulfur can be supplied with the raw water. Supply of raw water also takes place in dependence of the float controlled level guard 28 when the liquid level in the tank 10 decreases below a predetermined value, so that there is always maintained in the tank a predetermined liquid level. If the concentration of nutrient substances in the solution is disturbed at the refill in dependence of the level guard, appropriate concentration will be reset in dependence of the conductivity meter, the existing pH value as sensed by means of the pH meter determines if the stock solution in the vessel 20 or that in the vessel 23 shall be used for the supply.

If the liquid level in the tank 10 should sink so far that the test probes 27 of the conductivity meter will be free this would mean that the conductivity meter measures a resistance of indefinite value which is equivalent to an order of supply of nutrient solution from the vessel 20 or 23. This could happen if leakage arises in the circulation system or if the supply of raw water fails. If a concentrated nutrient solution be circulated to the plants this could be a catastrophe and could involve total destroyment of the plants. In order to eliminate this risk the level guard 28 is arranged such that it will close the solenoid valve 17 at a still lower level than that at which the supply of raw water starts, although the conductivity meter orders opening of said solenoid valve. The control signal from the level guard to the solenoid valve 17 thus overrides the control signal from the conductivity meter 24 and closes the valve 17 so that no further concentrated nutrient solution will be supplied to the tank.

When the plants take up $Ca(NO_3)_2$ from the nutrient solution the pH value of the solution will increase as mentioned above, the supply of concentrated nutrient solution taking place from the vessel 20 when the concentration of the solution has decreased sufficiently for the supply to be made. In case the pH value should decrease following a decrease of the nitrogen content due to the plants taking up $NH_4NO_3$, the supply will take place instead from the vessel 23 at a refill order from the conductivity meter. Excess of calcium, if any, is of no harm to the plants as mentioned above.

In the nutrient solutions used there should also be tracers. Iron is one such tracer but it cannot, as in known nutrient solutions for growing plants without soil, comprise a nitrate because the iron in that case would deposit in the nutrient solution and thus the plants would be in lack of iron. On the contrary, the iron must be supplied as iron chelate. The same is true for manganese which must be supplied as manganese chelate.

The conductivity of the nutrient solution in the tank 10 should range from 1400 to 4000 $\mu S/cm$ and preferably between 1600 and 1800 $\mu S/cm$. The pH value should range from 5.7 to 6.5 and preferably should be 5.8 with a variation of $\pm 0.1$.

In the practical working of the method according to the invention this method has turned out to give a good growth of the plants and a rich crop, in many cases up to more than three times the crop obtained when growing in the conventional manner by using soil. The control involving use of the two stock solutions in the vessels 20 and 23 has turned out to be less sensitive than a control in which there is used a basic and an acid as well as a third, acid or neutral solution as proposed before according to Swedish Pat. No. 331 610. The equipment furnishes the plants with plant nutriment as required for their growth and fruit setting without risk for such deviations in the balance of the plant nutrient solution as provide a lack of nutriment in one aspect or other whereby the plants are damaged occasionally or permanently. The system can be completely automatic and, as will be seen from the embodiment described, can have an inherent security to prevent failure of the raw water supply to provide a dangerous concentration in the nutrient solution.

The conductivity meter 26 which receives signals from the test probes 27 thereof comprising for example oxidized platina electrodes, and preferably is provided with thermistor means for temperature compensation, is connected to an amplifier 31 wherein the nominal value of the conductivity of the nutrient solution in the tank 10 can be adjusted. It is also connected to an amplifier 32 which in turn is connected to an alarm apparatus 33 for emitting an alarm signal at a predetermined maximum value of the conductivity, and to an amplifier 34 also connected to the alarm apparatus 33 for emitting an alarm signal at a predetermined minimum value of the conductivity. The amplifier 31 is arranged to supply start and stop signals, respectively, in dependence of a discrepancy between the actual value of the conductivity and the nominal value thereof, to a timer 35 which is connected to the pH meter 24. This meter receives a signal from the test probe 25.

Solenoid valves 17, 19 and 22 in FIG. 1 are replaced in this case by two pumps 36 and 37 arranged to pump stock nutrient solution from the vessel 20 and the vessel 23, respectively, to the tank 10, and one of these pumps is started to be operated for a predetermined time interval in dependence of the conductivity measured, over the timer 35. The pump which is started is dependent of the measured pH value and is selected by the pH meter 24.

Two level guards 28a and 28b are provided level guard 28a being connected to the solenoid valve 15 to close this valve at a predetermined maximum level in the tank 10. The amplifier 32 is also connected to the solenoid valve 15 in order to open said valve when the conductivity has reached a predetermined maximum value. Level guard 28b is connected to the solenoid valve 15 to open this valve at a predetermined lowermost liquid level in the tank 10 and is also connected to the timer 35 to stop simultaneously the pump, 36 or 37, which is operating.

Thus it will be seen that the function is principally the same as has been described above with reference to FIG. 1.

The timer 35 is arranged to control the operation of the actual pump 36 or 37 in such a manner that this pump is operated for intervals of 5 to 20 seconds and is allowed to be deenergized between these intervals for 1 to 10 minutes. The timer comprises means for manual presetting of these intervals which have to be adjusted to the total liquid volume of the system.

We claim:

1. An apparatus for growing plants in the absence of soil, comprising:
 means providing a circulating liquid plant nutrient medium;
 means to measure the conductivity of the nutrient medium;
 means to measure the pH of the nutrient medium;
 means providing a source of a first stock nutrient solution;
 means providing a source of a second stock nutrient solution;
 said first stock solution having a supply of nitrate nitrogen and said second stock solution having a supply of ammonium nitrogen;
 first control means actuatable by said means to measure the conductivity of the nutrient medium;
 said first control means being actuated to feed either said first or said second stock nutrient solution to said nutrient medium when the conductivity of said medium falls to a first predetermined value;
 second control means actuatable by said means to measure the pH of the nutrient medium;
 said second control means being actuated to select either said first or said second stock solution for feeding to the nutrient medium by said first control means;
 said first stock solution being selected by said second control means when the pH of the nutrient medium is below a predetermined pH value; and
 said second stock solution being selected by said second control means when the pH of the nutrient medium is above said predetermined pH value.

2. The apparatus of claim 1, including means to add water to the nutrient medium when the level of the nutrient medium falls below a first predetermined level.

3. The apparatus of claim 1, including means to shut off the supply of stock nutrient solution to said nutrient medium when the level of the nutrient medium falls below a second predetermined level which is less than said first predetermined level.

4. The apparatus of claim 1, including means to add raw water to the nutrient medium when the conductivity of the medium rises to a second predetermined value; and said second predetermined value is higher than said first predetermined value.

5. The apparatus of claim 1, including means to add water to the nutrient medium when the level of the nutrient medium falls below a first predetermined level.

6. The apparatus of claim 5, including means to shut off the supply of stock nutrient solution to said nutrient medium when the level of liquid nutrient medium falls below a second predetermined level even when the conductivity of the medium has risen to said second predetermined value; said second predetermined level being lower than said first predetermined level.

7. In a method for growing plants, said method including the steps of circulating a nutrient medium past the roots of the plants to be grown, measuring the pH of the nutrient medium, measuring the conductivity of the nutrient medium, and periodically supplying one or another of at least two stock nutrients to the nutrient medium;
 the improvement comprising:
 supplying one of said stock nutrients to said nutrient medium when the measured pH is below a predetermined level and the measured conductivity is below a first predetermined level; and
 supplying another of said stock nutrients to said nutrient medium when the measured pH is above a predetermined level and the measured conductivity is below said first predetermined level;

whereby the pH of the nutrient medium will be raised or lowered, as needed, by the plants consuming nutrients from the nutrient medium.

8. The improved method of claim 7, wherein the step of supplying one of said stock nutrients to said medium comprises supplying a metal nitrate to said nutrient medium so as to increase the pH of the nutrient medium by the consumption of nitrate by the plants; and wherein the steps of supplying another of said stock nutrients to the nutrient medium comprises supplying an ammonium salt to the nutrient medium so as to decrease the pH of the nutrient medium by the consumption of ammonium by the plants.

9. A method of growing plants according to claim 8, wherein said metal nitrate comprises nitrate nitrogen and said ammonium salt comprises ammonium nitrogen.

10. A method of growing plants according to claim 9, and further comprising the step of maintaining the potassium content of the nutrient medium at between about 100% and 150% of the nitrogen content of said nutrient medium.

11. A method of growing plants according to claim 10, wherein the potassium content is kept at about 125% of the nitrogen content of said nutrient medium.

12. A method of growing plants according to claim 8, wherein said ammonium salt comprises a mixture of nitrate nitrogen and ammonium nitrogen.

13. A method of growing plants according to claim 12, wherein said ammonium salt comprises a mixture of about 80% nitrate nitrogen and about 20% ammonium nitrogen.

14. A method of growing plants according to claim 8, wherein said metal nitrate comprises calcium nitrate.

15. A method of growing plants according to claim 7, and further comprising the step of blowing air into said nutrient medium.

16. A method of growing plants according to claim 7, and further comprising the step of blowing carbon dioxide into said nutrient medium.

17. A method of growing plants according to claim 7, and further including the steps of monitoring the surface level of the nutrient solution and adding water to the nutrient solution when the surface level falls below a first predetermined surface level.

18. A method of growing plants according to claim 17, and further including the steps of shutting off the supply of stock nutrient to said nutrient medium when the surface level of the nutrient medium falls below a second predetermined surface level, said second predetermined surface level being below said first predetermined surface level; whereby the plant being grown is protected from a nutrient having an injuriously high concentration of stock nutrient.

19. A method of growing plants according to claim 7, wherein the conductivity of the nutrient medium is maintained at between about 1400 S/cm and 4000 S/cm.

20. A method of growing plants according to claim 7, wherein the conductivity of the nutrient medium is maintained at between about 1600 S/cm and 1800 S/cm.

21. A method of growing plants according to claim 7, wherein the pH value of said nutrient medium is maintained between about 5.7 and 6.5.

22. A method of growing plants according to claim 7, wherein the pH value of said nutrient medium is maintained at about 5.8, plus or minus 0.1.

23. The method of claim 7, wherein:

said one and another stock nutrients having essentially the same concentration of the elemental nutrients required by the plants for growth;

said one and another stock nutrients having essentially the same pH;

said one stock nutrient supplying nitrate nitrogen;

said another stock nutrient supplying ammonium nitrogen.

24. The method of claim 23, including adding raw water to the nutrient medium when the conductivity of the medium rises to a second predetermined conductivity level; said second predetermined conductivity level being higher than said first predetermined conductivity level.

25. The method of claim 7, including adding raw water to the nutrient medium when the conductivity of the medium rises to a second predetermined conductivity level higher than said first predetermined conductivity level.

26. In an apparatus for growing plants by circulating a nutrient medium past the roots of the plants to be grown, said apparatus including a reservoir for said nutrient medium, a first container for a first stock nutrient, a second container for a second stock nutrient, means for measuring the conductivity of the nutrient medium, and means for measuring the pH of the nutrient medium;

the improvement comprising:

primary control means operatively connected to said conductivity measuring means for supplying a stock nutrient to the nutrient medium when the measured conductivity of the nutrient medium is below a first predetermined conductivity level;

first secondary control means operatively connected to said pH measuring means and responsive to a measured pH of said nutrient medium below a predetermined pH level to supply a first stock nutrient to the nutrient medium when said primary control means is operative to supply stock nutrient to said nutrient medium in response to said conductivity measuring means sensing the conductivity of said nutrient medium as being below said first predetermined level; and second secondary control means operatively connected to said pH measuring means and responsive to a measured pH of said nutrient medium above a predetermined pH level to supply a second stock nutrient to the nutrient medium when said primary control means is operative to supply stock nutrient to said nutrient medium in response to said conductivity measuring means sensing the conductivity of said nutrient medium as being below said first predetermined level.

27. The apparatus of claim 26, including means to add water to the nutrient medium when the surface level of the nutrient medium falls below a first predetermined surface level.

28. The apparatus of claim 27, including means to shut off the supply of stock nutrient to said nutrient medium when the surface level of the nutrient medium falls below a second predetermined surface level.

29. The apparatus of claim 26, including means to add raw water to the nutrient medium when the conductivity of the medium rises to a second predetermined conductivity level; said second predetermined conductivity level being higher than said first predetermined conductivity level.

30. The apparatus of claim 29, including means to add water to the nutrient medium when the surface level of the nutrient medium falls below a first predetermined surface level.

31. The apparatus of claim 30, wherein said nutrient medium comprises a liquid, and further including means to shut off the supply of stock nutrient to said nutrient medium when the surface level of said liquid nutrient medium falls below a second predetermined surface level regardless of whether the conductivity of the medium has risen to said second predetermined conductivity level; said second predetermined surface level being lower than said first predetermined surface level.

32. The apparatus of claim 26, wherein said control means comprises valves;

said primary control means comprising a valve operable by said conductivity measuring means to admit the flow of fluid therethrough when the measured conductivity is below a first predetermined conductivity level, and to block the flow of fluid therethrough when the measured conductivity is above said first predetermined conductivity level; and wherein said first and second secondary control means comprises first and second secondary valves; each of said valves being operable by said pH measuring means.

33. The apparatus of claim 32, wherein said primary valve means is disposed between said secondary valve means and said nutrient medium reservoir; and said first and second secondary valve means are in parallel fluid flow paths with one another.

34. A method for growing plants, without soil, by means of a nutrient solution circulating in a closed system, wherein nutrient consumed by the plants is replaced by the supply of, alternatively, one or the other of two concentrated stock solutions in dependence upon the measured pH and the measured conductivity of the nutrient solution, characterized in that:

the supply of stock solution takes place in dependence upon the decrease of the conductivity below a predetermined value;

and further characterized in that at the supply thus controlled by the conductivity one or the other of the two stock solutions is selected in dependence upon the measured pH in such a manner that one stock solution by which nitrogen is supplied as a nitrate is supplied when the pH of the nutrient is below a predetermined value in order to increase the pH by the consumption of nitrate by the plants; and the other stock solution by which nitrogen is supplied in the form of ammonium is supplied when the pH of the nutrient is below the predetermined value for decreasing the pH by the consumption of ammonium by the plants.

* * * * *